May 19, 1959   P. S. MACGREGOR ET AL   2,887,297
HOSE- OR CABLE-CARRYING WINCHES
Filed Aug. 15, 1955   5 Sheets-Sheet 1

P. S. Macgregor and
A. W. Goodliffe
INVENTORS
BY Watson, Cole, Grindle & Watson
ATTORNEYS

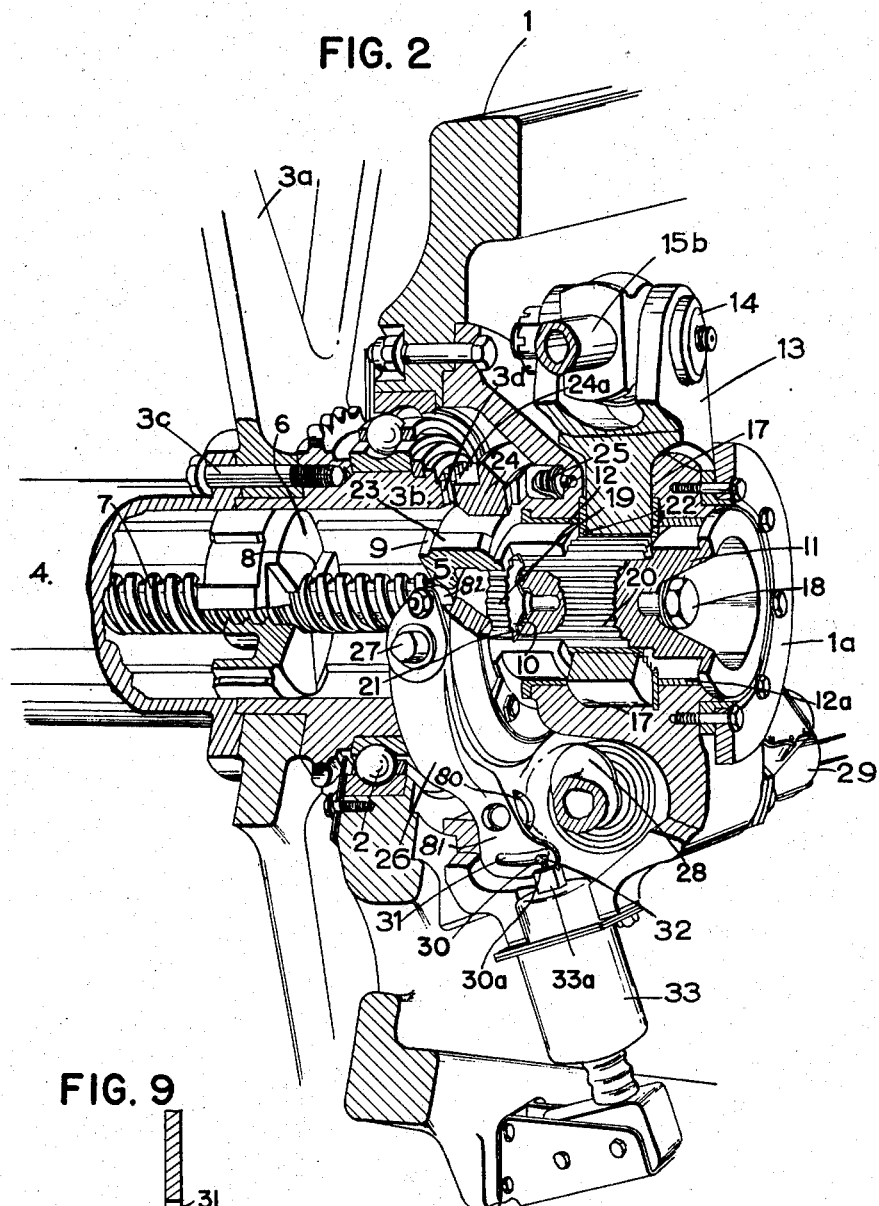
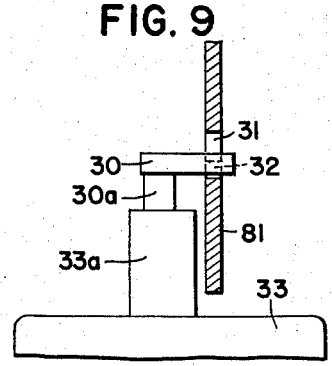

May 19, 1959   P. S. MACGREGOR ET AL   2,887,297
HOSE- OR CABLE-CARRYING WINCHES
Filed Aug. 15, 1955   5 Sheets-Sheet 3

P. S. Macgregor and
A. H. Goodliffe
INVENTORS
BY Watson, Cole Grindle
& Watson
ATTORNEYS

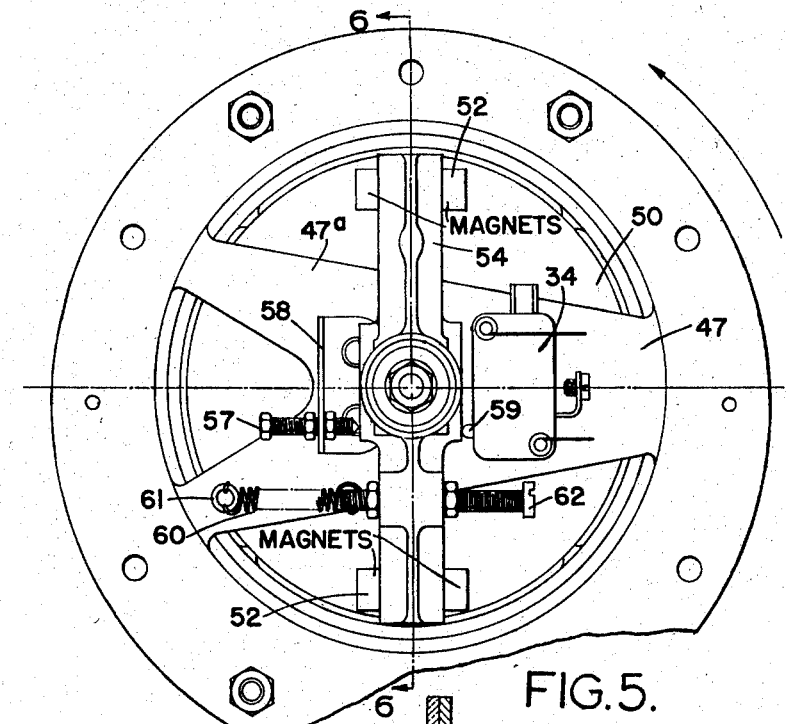
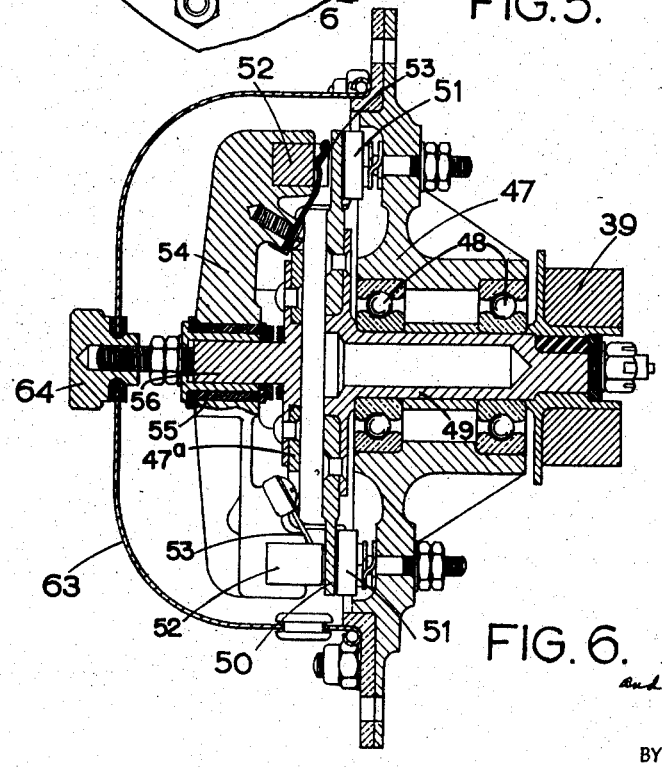

United States Patent Office

2,887,297
Patented May 19, 1959

2,887,297

HOSE- OR CABLE-CARRYING WINCHES

Peter S. Macgregor, Upton, Poole, and Arthur W. Goodliffe, St. John's Hill, Wimborne, England, assignors to Flight Refueling Incorporated, Danbury, Conn., a corporation of Delaware Application August 15, 1955, Serial No. 531,856

Claims priority, application Great Britain August 27, 1954

8 Claims. (Cl. 254—173)

The invention herein described relates to winches and is especially applicable to airborne winches carrying a refuelling hose or towing cable.

An object of the invention is to provide a winch, drivable by a motor in the sense for taking-up hose or cable, with improved means of checking over-run when paying-out under tension applied to the hose or cable.

Another object of the invention is to combine a resilient reel-arrester with means for clutching it to the reel, such clutch means being spring-loaded to effect clutch-engagement and provided with latch means under the control of an electro-magnetic actuator so as to be effective to hold said clutch means disengaged when the actuator is excited and to release said clutch-means for spring-engagement when the excitation of the actuator ceases.

A still further object of the invention is to provide a second electro-magnetic actuator adapted when excited to re-set the clutch means to disengaged position for retention by said latch means, said actuator being preferably of a rotary type and including a clutch-disengaging cam.

Yet another object of the invention is to place said latch-controlling electro-magnetic actuator under the control, through a relay, of an overspeed governor, operative to open the exciting circuit of said actuator when the paying-out speed of the reel exceeds a safe value, the governor being inoperative when the reel is taking-up.

The accompanying drawings illustrate an embodiment of the invention, given by way of example only, and without implied limitation of the invention, which includes all such modifications, substitution of equivalent mechanisms and devices, and other such variations as may be within the competence of those skilled in the art, the scope of the invention being defined in the appended claims. In the drawings, Figure 1 is a fragmentary side elevation of the winch;

Figure 2 is a partly sectioned, fragmentary perspective view thereof on an enlarged scale, taken from the same side as Figure 1;

Figure 5 is an elevation (partly broken away and with cover plate removed) of an alternative form of the detail ringed in Figure 3;

Figure 6 is a section on the line 6—6 of Figure 5;

Figure 7:
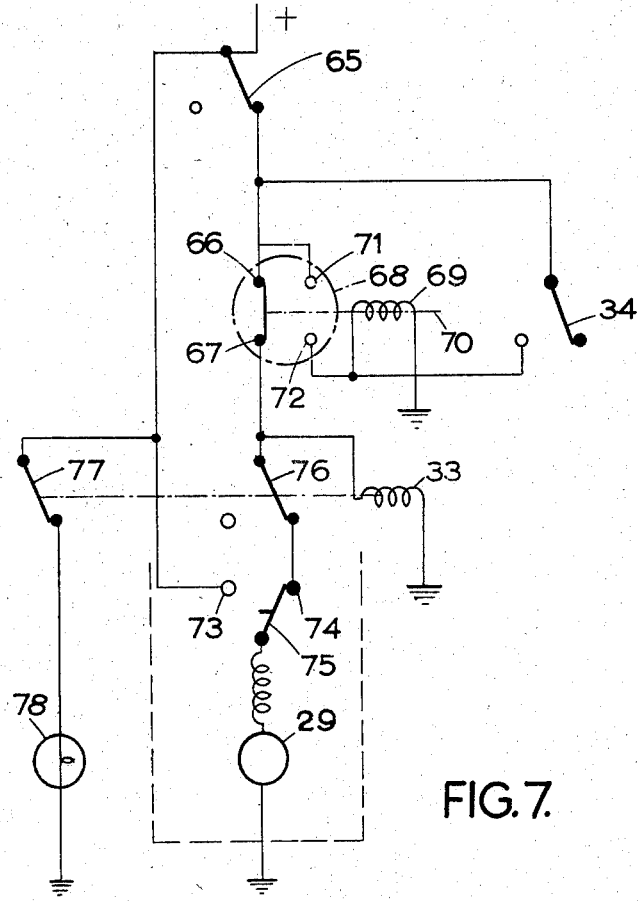
Figure 7 is an electrical circuit diagram.
Figure 8:
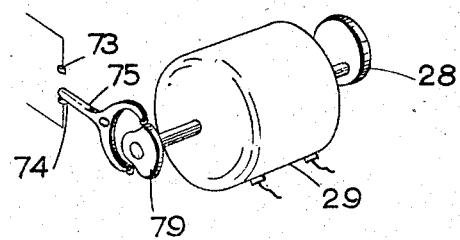

Figure 8 illustrates in perspective and on an enlarged scale, certain details of the rotary actuator and its associated selector switch, which elements are indicated generally in the circuit diagram of Fig. 7; and Fig. 9 is a greatly enlarged detail side elevation of part of the linear actuator as seen from the right in Fig. 2, and its interconnection to the yoke, the yoke being shown fragmentarily and in section.

In the instant application, the several improved features of the invention are illustrated as incorporated in a power driven winch of the general type such as is commonly employed in aircraft for flight refueling operations, wherein the winch pays out a predetermined length of hose to trail behind the aircraft which carries it for coupling to suitable means on another aircraft.

Figure 1:
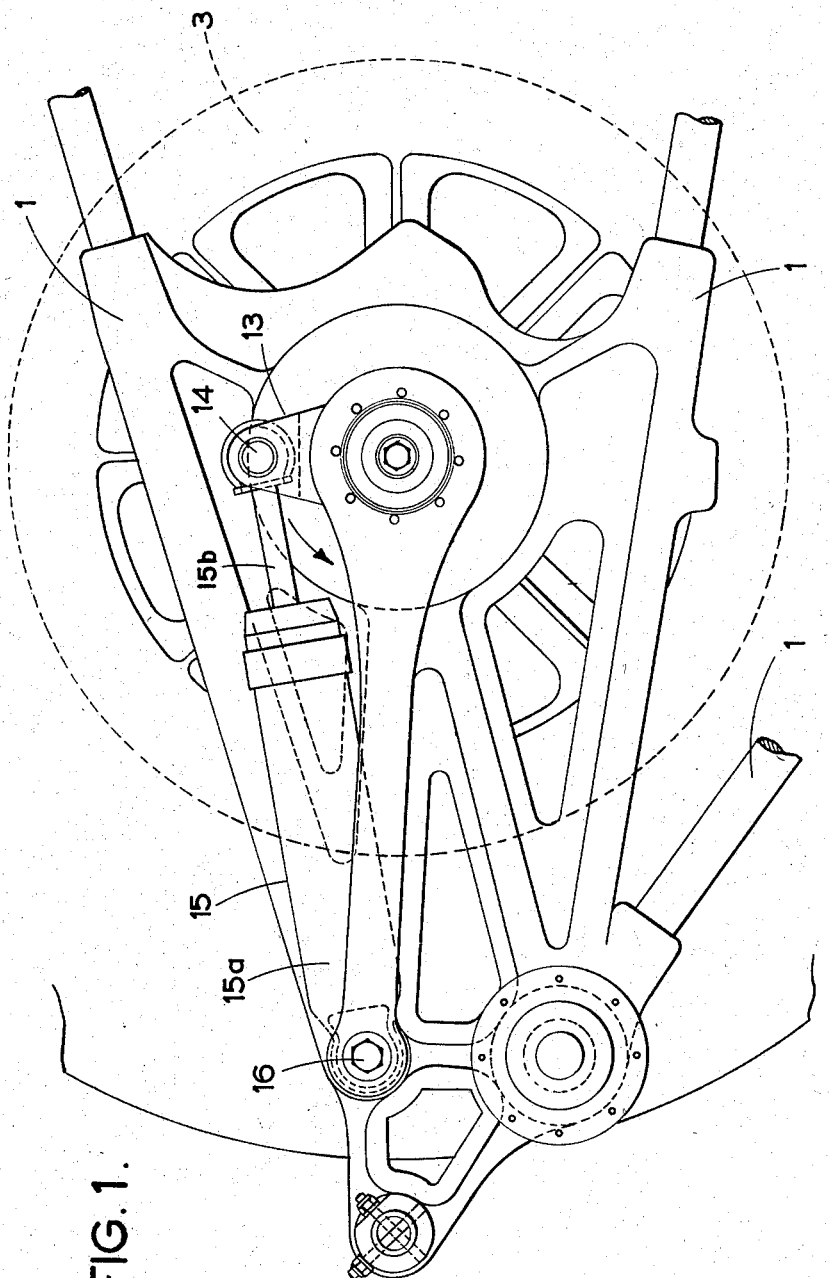

Referring to the drawings, a reel 3 carrying a flexible element 47, which may exemplify either a towing cable or a fuel hose (Figure 3), is mounted in a framework 1, to which is pivotally anchored at 16 one part 15a of the liquid spring unit or brake 15 whose other part 15b is pivotally connected at 14 to a lever 13, which is pivotally mounted coaxially with the reel as hereinafter more fully disclosed; the parts 15a, 15b of the spring unit 15 are constituted by relatively displaceable cylinder and piston elements confining a liquid, which is volumetrically compressed when the unit 15 is shortened by angular movement of the lever 13 in the direction of the arrow (Figure 1). In the example illustrated, the full stroke of the spring unit 15 corresponds to about 90° movement of the lever 13 (see Figure 1). The liquid spring unit may be of conventional structure such as is disclosed in the Dowty, United States Patent No. 2,346,667, of April 18, 1944. By virtue of its resistance to counterclockwise movement of the lever 13 the liquid spring unit 15 will obviously function as a brake.

The reel 3 comprises side plates, of which one is shown at 3a in Figure 2, and a hollow axle 4 supported by the framework 1 in bearings, of which one is shown at 2 in Figure 2. The inner race of bearing 2 is mounted on a boss 3b secured by studs 3c to the side plate 3a and forming a continuation of axle 4. (The invention is not concerned with the sprocket formed on boss 3b shown in Figure 2.) The reel is driven in the sense for taking up the hose 47 by a motor through a fluid coupling gearing and a chain-drive of conventional construction and forming no part of the invention, for which reason these parts are not described or fully illustrated.

The lever 13 is internally serrated to engage corresponding external serrations 20 on a plug 11 which is rotatably mounted, by means of bushings 12a, in a dished casting 1a secured to the framework 1 and provided with a slotted recess 17 to accommodate the lever 13, the latter being axially located between the flanks of the recess between which and the lever are disposed washers 22. The plug 11 further carries a dog ring 5, herein referred to as the engaging ring, which is internally serrated to engage external serrations 20 of plug 11 and is rotatably mounted by means of bushings 12 in the casting 1a. The plug 11, lever 13 and engaging ring 5 can thus rotate as a unit in the casting 1a, with respect to which the engaging ring 5 and plug 11 are axially located by suitable shoulders.

In the example illustrated, the engaging ring 5 is axially located by means of a shoulder and a cotter 21 engaging the enlarged head 10 of a lead-screw 7 secured to the plug 11 by a stud 18, the head 10 having external serrations 19 engaging the internal serrations of the engaging ring. The lead screw 7 which carries a dognut 6 slidably but not rotatively mounted in the axle 4 and having teeth 8 engageable with teeth 9 formed on the engaging ring 5, forms no part of the present invention, but is more fully described in the specification of our co-pending patent application Serial No. 377,562.

The engaging ring 5 is externally splined at 23 to receive an internally splined dog ring 24 having a serrated face 24a engageable with corresponding serrations 3d formed in the face of boss 3b. The dog ring 24 is loaded by springs 25 which normally hold it in engagement with boss 3b, but is disengageable by means of a dog ring disengaging member or yoke 26, pivotally supported in the casting 1a by means of trunnions 27 and actuable for disengaging the dog ring 24 by means of a cam 28 operated by a rotary electro-magnetic actuator 29. It will be seen from Figure 2 that the lobe of cam 28 is disposed for operative engagement with a follower 80 carried by a depending lever arm 81 of the yoke. Such engagement will rock the yoke 26 in a clockwise direction (as seen in Figure 2) about its supporting trunnions 27, whereby the element 82 at the upper free ends of the yoke arms will urge the dog ring 24 toward the right in Figure 2, or in a direction to disengage it from the boss 3b.

The yoke 26 can be locked in the dog ring-disengaging position by means of a pin or latch 30 engaging a slot 31 in the depending arm 81 of the yoke, which slot terminates in a notch 32 extending downwardly from its lower edge. When pin 30 engages in notch 32 the yoke is locked in the dog ring-disengaging position. Pin 30 is controlled by a linear electro-magnetic actuator 33, which, when excited, holds the pin in the notch 32, but when not excited allows the pin to be moved out of the notch by spring means (not illustrated), whereupon the springs 25 cause the dog ring 24 to engage the boss 3b, thus connecting the reel, through the engaging ring 5 and lever 13, to the liquid spring unit 15 and thereby resiliently arresting the reel.

Pin 30 is carried by the linearly movable plunger 33a of actuator 33 for movement toward the upper edge of slot 31, and thus out of notch 32, when the actuator is de-energized. Normally, however, the actuator is energized to retain the pin 30 in notch 32 to immobilize the yoke 26 in the position of Figure 2, wherein it retains the dog ring 24 disengaged.

It will be observed that the apparatus is designed to "fail safe," since, in the event of an electrical failure, the actuator 33 will release the pin 30 from the notch 32, thus allowing the dog ring 24 to engage the boss 3b and arrest the reel resiliently.

Figure 3:
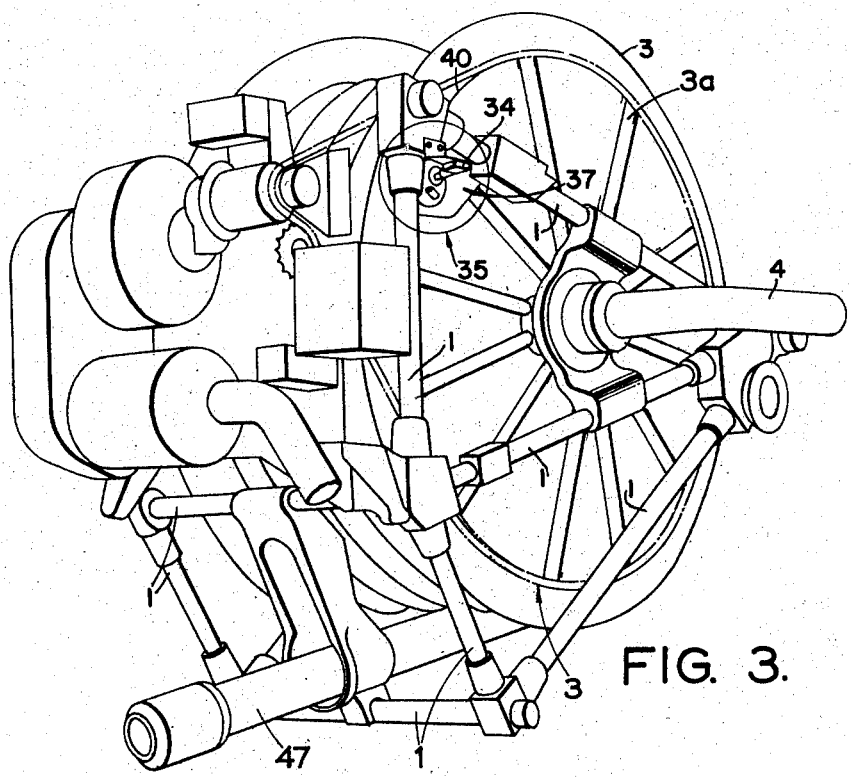
Figure 3 is a perspective view thereof, taken from the opposite side to the views of Figures 1 and 2.
Figure 4:
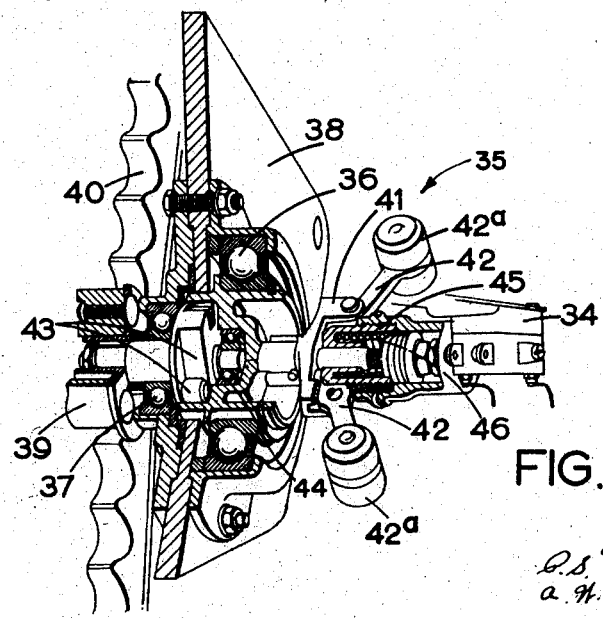
Figure 4 is a partly sectioned, fragmentary, perspective view on an enlarged scale of the detail ringed in Figure 3.

The excitation of the actuator 33 is controlled through a relay switch 68, 69 (Figure 7) by a microswitch 34 operated by a speed governor 35 (see Figures 3 and 4).

The speed governor illustrated in Figure 4 is of the centrifugal type and comprises a rotary assembly supported in bearings 36, 37, mounted on a gusset plate 38 which is secured to the framework 1 (Figure 3).

The rotary assembly comprises a pin wheel 39, driven by a sprocket 40 mounted on the reel, and a fly-weight carrier 41 on which are pivotally mounted levers 42 carrying flyweights 42a. The pin wheel 39 drives the flyweight carrier 41 through a unidirectional roller clutch 43, the mutual alignment of the pin wheel and flyweight carrier being ensured by a steady bearing 44. The toes of the flyweight levers 42 bear against a cap 45, loaded in opposition to the centrifugal force of the flyweights by a spring 46, and so disposed as to actuate the movable contact of the microswitch 34 (which movable contact is hidden in Figure 4). The roller clutch 43 ensures that the flyweight carrier 41 is only rotated when the reel is rotating in the sense for paying out the hose 47 (Figure 3). When the paying out speed exceeds a predetermined critical value to which the spring loading 46 of the governor is set, the governor closes the contacts of the microswitch 34 and excites the relay 68, 69, which thereupon opens the circuit of the actuator 33 thereby causing the reel to be resiliently arrested as explained above.

Once the dog ring 24 has engaged the boss 3b to arrest the reel, re-excitation of the actuator 33 will not disengage the dog ring from the boss 3b, since the pin 30 is no longer opposite the notch 32 of the slot 31. In order to disengage the dog ring 24 from the boss 3b the rotary actuator 29 must be excited so as to rotate the cam 28 and thereby rock the dog ring-actuating yoke 26 into the dog ring-disengaging position, whereupon the actuator 33, being excited, will move the pin 30 into the notch 32, thereby locking the yoke 26 in the dog ring-disengaging position.

Figures 5 and 6 illustrate an alternative form of speed governor operating on the eddy-current principle. It comprises a housing 47 which is secured to the gusset plate 37 (Figure 3) and supports two bearings 48 in which a shaft 49 is rotatably mounted. One end of this shaft carries the pin wheel 39 and the other end carries a disc rotor 50, the margin of which rotates between fixed pole pieces 51 and a pair of permanent magnets 52 detachably mounted and retained by springs 53 in recesses in the extremities of a yoke 54, which is rotatably mounted by means of a bushing 55 on a spindle 56 coaxial with the shaft 49 and secured to a web 47a of the housing 47. Rotation of the magnet-carrying yoke 54 in the sense opposite to the arrow in Figure 5 is prevented by means of an adjustable stop screw 57 mounted in a bracket 58 secured to the housing 47; and the opposite face of the yoke 54 to that which engages the stop screw 57 engages the actuating button 59 of the microswitch 34, so that a small rotational displacement of the yoke 54 in the sense of the arrow of Figure 5 from the limiting position determined by the stop screw 57 depresses the button 59 and causes the microswitch to close. Rotational displacement of the yoke 54 in this sense is resisted by a spring 60 anchored to the housing 47 at 61. The tension of this spring can be adjusted by means of an adjusting screw 62. This mechanism is enclosed by a cover 63 secured by a nut 64 to a threaded extension of the spindle 55.

Rotation of the rotor 50 between the fixed poles 51 and magnets 52 sets up eddy-currents in the rotor which impose a rotational drag on the magnets 52 tending to rotate the yoke 54 in the same sense as the rotor 50. If the rotation is in the sense of the arrow (Figure 5) which corresponds to rotation of the reel 3 (Figure 3) in the sense for paying out the hose 47, then, on reaching a critical rotational speed, the rotational drag on the magnets 52 overcomes the tension of spring 60 and causes a rotational displacement of the yoke 54 sufficient to depress the actuating button 59 of the microswitch 34 and close the latter, thus exciting the above-mentioned relay to open the circuit of the actuator 33 (Figure 2) and thereby arrest the reel resiliently in the manner previously explained. Rotation of the rotor 50 in the sense opposite to the arrow of Figure 5 has no effect, since the yoke 54, if free to move in this sense, would move away from the actuating button of the microswitch and is in any case prevented from moving in this sense by the stop screw 57.

The linear actuator 33 is excited (Figure 7) from the positive side, +, of a D.C. supply with earth return, through a manual master switch 65 and through two contacts 66, 67 of relay switch 68. A relay coil 69, when excited through the master switch 65 and through the governor-actuated microswitch 34, attracts its armature 70 and thereby opens the circuit through contacts 66, 67 and closes a circuit through two other contacts 71, 72 of switch 68, thereby short-circuiting switch 34 and maintaining the excitation of coil 69.

The rotary actuator 29 is excitable through either contact 73 or 74 of a selector switch 75, of which contact 73 is directly connected to the positive main + and contact 74 is connected to contact 67 of the relay switch 68 through a switch 76 actuated by the plunger of the linear actuator 33, which also actuates a switch 77 in a circuit connecting contact 73 with an indicator lamp 78. Switch 75 is actuated by a cam 79 on the shaft of the rotary actuator 29 (Figure 8).

The cam 79 is so profiled and so phased with respect to cam 28 (Figure 2) that, as the latter rotates to disengage the dog ring 24, switch 75 remains on contact 74 until just before the dog ring disengages, whereupon switch 75 is thrown onto contact 73 and is held there until cam 28 has completed a revolution back to its initial position, when switch 75 is returned to contact 74.

As long as the notch 32 of yoke 26 is out of register with the pin 30 (Figure 2) the actuator 33 cannot attract its plunger, even though it is excited, and until the plunger is attracted switch 76 remains closed. If then the manual master switch 65 is closed and the relay switch 68 is closed on contacts 66, 67, the actuator 29 will be excited through contact 74 and rotate cam 28 to rock the yoke 26 and disengage the dog ring 24, thus releasing the reel 47 for rotation, but as soon as the dog ring is fully disengaged notch 32 registers with the pin 30, and the plunger of actuator 33 is attracted, thus engaging pin 30 in notch 32 and locking the dog ring 24 in disengaged position, and at the same time opening switch 76. The actuator 29, however, continues to be excited through contact 73, owing to the action of cam 79 until cam 28 has completed its revolution and cam 79 has moved switch 75 back onto contact 74, which is now dead owing to the opening of switch 76. The excitation of actuator 29 therefore ceases.

When switch 34 closes and excites the relay coil 69 to open the circuit of actuator 33, the latter releases pin 30 from notch 32 allowing the dog ring 24 to engage and arrest the reel, at the same time closing switch 76. The rotary actuator 29, however, is not re-excited, since its circuit is kept open at switch 68, notwithstanding that switch 34 opens when the reel is arrested, because closure of switch 68 on contacts 71, 72 maintains the excitation of coil 69.

Therefore, to disengage the dog ring 24 and free the reel for resumption of paying out, it is necessary to open the master switch 65, thus opening the circuit of coil 69, whereupon its armature 70 restores the movable contact of switch 68 to the contacts 66, 67, so that on re-closure of switch 65 the actuator 29 is once more excited through switches 68, 76 and 75.

In the illustrated embodiment, switch 77 is ganged to switch 76 so that the former closes and opens concurrently with the latter. The indicator lamp 78 is therefore lit-up at all times except when the plunger of actuator 33 is attracted, i.e. when the pin 30 is engaged in notch 32 to lock the yoke 26 in the dog ring-disengaging position. The lamp 78, when lit-up, thus indicates that the reel is locked against rotation by the dog ring 24, and extinction of lamp 78 indicates that the reel is freed.

We claim:

1. A winch comprising a fixed frame member and a reel rotatable thereon, a lever mounted on said frame member coaxially of said reel for limited rotation, resilient brake means for arresting said reel against overrun when paying out a hose or cable under tension, said means comprising a spring device of the linear compression and extension type, one end of which is anchored to said frame member and the other end is connected to said lever, a dog fixed to said reel, a dog-ring slidably mounted for axial displacement relatively to said reel for engagement with and disengagement from said dog, means interconnecting said lever and said dog ring for rotary movement together while permitting relative axial displacement of said dog ring, spring means operative on said dog ring to displace it towards said dog for engagement therewith, a dog ring-disengaging member, latch means operative to retain said member in dog ring-disengaging position and to release it and allow said dog ring to be moved to dog-engaging position, an electro-magnet actuator operative when excited to retain said latch means in position for so retaining said dog ring-disengaging member, and when not excited to cause said latch means to release said dog ring-disengaging member, and a second electro-magnetic actuator operative when excited to re-set said dog ring-disengaging member in dog ring-disengaging position for retention in such position by said latch means.

2. A winch comprising a fixed frame member and a reel rotatable thereon, a lever mounted on said frame member coaxially of said reel for limited rotation, resilient brake means for arresting said reel against overrun when paying out a hose or cable under tension, said means comprising a spring device of the linear compression and extension type, one end of which is anchored to said frame member and the other end is connected to said lever, a dog fixed to said reel, a dog ring slidably mounted for axial displacement relatively to said reel for engagement with and disengagement from said dog, means interconnecting said lever and said dog ring for rotary movement together while permitting relative axial displacement of said dog ring, spring means operative on said dog ring to displace it towards said dog for engagement therewith, a dog ring-disengaging member, latch means operative to retain said member in dog ring-disengaging position and to release it and allow said dog ring to be moved to dog-engaging position, an electro-magnetic actuator operative when excited to retain said latch means in position for so retaining said dog ring-disengaging member, and when not excited to cause said latch means to release said dog ring-disengaging member, a cam, and a rotary electro-magnetic actuator operative when excited to rotate said cam and thereby cause it to re-set said dog ring-disengaging member in dog ring-disengaging position for retention in such position by said latch means.

3. A winch comprising a fixed frame member and a reel rotatable thereon, a lever mounted on said frame member coaxially of said reel for limited rotation, resilient brake means for arresting said reel against overrun when paying out a hose or cable under tension, said means comprising a spring device of the linear compression and extension type, one end of which is anchored to said frame member and the other end is connected to said lever, a dog fixed to said reel, a dog ring slidably mounted for axial displacement relatively to said reel for engagement with and disengagement from said dog, means interconnecting said lever and said dog ring for rotary movement together while permitting relative axial displacement of said dog ring, spring means operative on said dog ring to displace it towards said dog for engagement therewith, a dog ring-disengaging member, latch means operative to retain said member in dog ring-disengaging position and to release it and allow said dog ring to be moved to dog-engaging position, an electro-magnetic actuator operative when excited to retain said latch means in position for so retaining said dog ring-disengaging member, and when not excited to cause said latch means to release said dog ring-disengaging member, a relay switch controlling the excitation of said actuator, a relay switch-controlling electric circuit operative when closed to open said relay switch, a switch in said circuit, an overspeed governor driven by said reel and operative to close said last-named switch when the reel rotates in the paying-out sense at a super-critical speed, said governor being inoperative to close said last-named switch when the reel rotates in the taking-up sense, and a second electro-magnetic actuator operative when excited to re-set said dog ring-disengaging member in dog ring-disengaging position for retention in such position by said latch means.

4. A winch comprising a fixed frame member and a reel rotatable thereon, a lever mounted on said frame member coaxially of said reel for limited rotation, resilient brake means for arresting said reel against overrun when paying out a hose or cable under tension, said means comprising a spring device of the linear compression and extension type, one end of which is anchored to said frame member and the other end is connected to said lever, a dog fixed to said reel, a dog ring slidably mounted for axial displacement relatively to said reel for engagement with and disengagement from said dog, means interconnecting said lever and said dog ring for rotary movement together while permitting relative axial displacement of said dog ring, spring means operative on said dog ring to displace it towards said dog for engagement therewith, a dog ring disengaging member, latch means operative to retain said member in dog ring-disengaging position and to release it and allow said dog ring to be moved to dog-engaging position, an electro-magnetic actuator operative when excited to retain said latch means in position for so retaining said dog ring-disengaging member, and when not excited to cause said latch means to release said dog ring-disengaging member, a relay switch controlling the excitation of said actuator, a relay switch-controlling electric circuit operative when closed to open said relay switch, a switch in said circuit, an overspeed governor, a free-wheel clutch operative between said reel and said governor to drive said governor when the reel rotates in the paying-out sense but not otherwise, said governor being operative when driven at a supercritical speed to close said last-named switch, and a second electro-magnetic actuator operative when excited to re-set said dog ring-disengaging member in dog ring-disengaging position for retention in such position by said latch means.

5. A winch comprising a fixed frame member and a reel rotatable thereon, a lever mounted on said frame member coaxially of said reel for limited rotation, resilient brake means for arresting said reel against overrun when paying out a hose or cable under tension, said means comprising a spring device of the linear compression and extension type, one end of which is anchored to said frame member and the other end is connected to said lever, a dog fixed to said reel, a dog ring slidably mounted for axial displacement relatively to said reel for engagement with and disengagement from said dog, means interconnecting said lever and said dog ring for rotary movement together while permitting relative axial displacement of said dog ring, spring means operative on said dog ring to displace it towards said dog for engagement therewith, a dog ring-disengaging member, latch means operative to retain said member in dog ring-disengaging position and to release it and allow said dog ring to be moved to dog-engaging position, an electro-magnetic actuator operative when excited to retain said latch means in position for so retaining said dog ring-disengaging member, and when not excited to cause said latch means to release said dog ring-disengaging member, a relay switch controlling the excitation of said actuator, a relay switch-controlling electric circuit operative when closed to open said relay switch, a switch in said circuit, an overspeed governor driven by said reel, said governor including a switch-actuating member operative to close said last-named switch when the reel rotates in the paying-out sense at a supercritical speed, but inoperative to close said last-named switch when the reel rotates in the taking-up sense, and a second electro-magnetic actuator operative when excited to re-set said dog ring-disengaging member in dog ring-disengaging position for retention in such position by said latch means.

6. A winch as defined in claim 2 including further a first electric circuit for exciting said rotary actuator, a latch means-actuated switch in said first electric circuit, said switch being closed when said latch means is in releasing position and open when said latch means is in retaining position, a second electric circuit for exciting said rotary actuator, a selector switch for connecting said rotary actuator alternatively to said first and second electric circuits, and a second cam actuated by said rotary actuator and operative on said selector switch to connect the rotary actuator to said first electric circuit while said first-named cam is re-setting said dog ring-disengaging member into dog ring-disengaging position and to connect the rotary actuator to said second exciting circuit while said first-named cam rotates idly after re-setting said dog ring-disengaging member until it has made one complete revolution, on completing which the second-named cam returns said selector switch to its initial position connecting said rotary actuator to said first electric circuit.

7. A winch as defined in claim 2 including further a first electric circuit for exciting said rotary actuator, a latch means-actuated switch in said first electric circuit, said switch being closed when said latch means is in releasing position and open when said latch means is in retaining position, a normally closed switch in series with said latch means-actuated switch, an overspeed governor driven by said reel and operative to open said normally closed switch when the reel rotates in the paying out sense at a super-critical speed, a second electric circuit for exciting said rotary actuator, a selector switch for connecting said rotary actuator alternatively to said first and second electric circuits, and a second cam actuated by said rotary actuator and operative on said selector switch to connect the rotary actuator to said first electric circuit while said first-named cam is re-setting said dog ring-disengaging member into dog ring-disengaging position and to connect the rotary actuator to said second electric circuit while said first-named cam rotates idly after re-setting said dog ring-disengaging member until it has made one complete revolution, on completing which the second-named cam returns said selector switch to its initial position connecting said rotary actuator to said first electric circuit.

8. A winch as defined in claim 3 in which the relay switch-controlling circuit includes a relay switch-actuating coil, the combination further including a coil-excitation-maintaining circuit closable by said coil when excited, and a manually operable master switch for isolating the relay switch-controlling circuit, the coil-excitation-maintaining circuit and the latch means-retaining actuator.

References Cited in the file of this patent

UNITED STATES PATENTS

| | | |
|---|---|---|
| 851,934 | Gurney | Apr. 30, 1907 |
| 1,305,006 | Read | May 27, 1919 |
| 1,560,057 | Hunter | Nov. 3, 1925 |